United States Patent
El Gabbouch et al.

(10) Patent No.: US 9,774,408 B2
(45) Date of Patent: Sep. 26, 2017

(54) MOBILE COMMUNICATION TERMINAL TEST DEVICE AND A TEST ANAYLSIS UNIT THEREFOR

(71) Applicant: ANRITSU CORPORATION, Kanagawa (JP)

(72) Inventors: Mohamed El Gabbouch, Luton (GB); Simon Baldwin, Luton (GB)

(73) Assignee: ANRITSU CORPORATION, Kanagawa (JP)

(*) Notice: Subject to any disclaimer, the term of this patent is extended or adjusted under 35 U.S.C. 154(b) by 202 days.

(21) Appl. No.: 14/799,957

(22) Filed: Jul. 15, 2015

(65) Prior Publication Data

US 2016/0149653 A1    May 26, 2016

(30) Foreign Application Priority Data

Nov. 24, 2014 (GB) .................................. 1420806.0

(51) Int. Cl.
*H04B 17/15* (2015.01)
*H04B 17/29* (2015.01)
*H04B 17/00* (2015.01)
*H04B 17/17* (2015.01)
*H04B 17/23* (2015.01)
*H04B 17/26* (2015.01)

(52) U.S. Cl.
CPC ......... *H04B 17/0085* (2013.01); *H04B 17/17* (2015.01); *H04B 17/23* (2015.01); *H04B 17/26* (2015.01)

(58) Field of Classification Search
CPC .............................. H04B 17/15; H04B 17/29
See application file for complete search history.

(56) References Cited

U.S. PATENT DOCUMENTS

| | | | | |
|---|---|---|---|---|
| 2007/0234293 A1* | 10/2007 | Noller | ................. | G06F 11/3688 717/124 |
| 2008/0010542 A1* | 1/2008 | Yamamoto | .......... | G06F 11/3672 714/38.1 |
| 2009/0271661 A1* | 10/2009 | Miyai | ................... | G06F 11/263 714/35 |
| 2013/0283100 A1* | 10/2013 | Asano | ................. | G06F 11/3668 714/32 |

* cited by examiner

*Primary Examiner* — Charles C Jiang
*Assistant Examiner* — Thad Defauw
(74) *Attorney, Agent, or Firm* — Pearne & Gordon LLP

(57) ABSTRACT

A mobile communication terminal test device communicates with a mobile communication terminal to perform a test operation. The test device includes a test analysis unit responsive to a user-selected test from a data store, the test analysis unit determining an execution path of each of a plurality of test operations in the test log corresponding to the user-selected test scenario and comparing the execution path of each of a plurality of test operations to the plurality of execution paths of the user-selected test, and displays a screen comparing the execution path of each of a plurality of test operations to the plurality of execution paths of the user-selected test on a display unit.

4 Claims, 4 Drawing Sheets

MOBILE COMMUNICATION TERMINAL TEST DEVICE AND A TEST ANAYLSIS UNIT THEREFOR

FIELD OF THE INVENTION

The present invention relates to a mobile communication terminal test device that communicates with a mobile communication terminal to perform a test operation, such as an operation of evaluating the performance of the mobile communication terminal.

BACKGROUND AND PRIOR ART

When mobile communication terminals typified by mobile phones are developed, a mobile communication terminal test device is used to test whether the mobile communication terminal under development operates as designed and whether the mobile communication terminal normally operates according to a communication standard.

A test scenario in which the operation sequence and communication sequence of the mobile communication terminal test device are defined is created in advance and stored, and the mobile communication terminal test device operates as a pseudo mobile network, simulating the behaviour of multiple elements in the network such as base station, mobile switching centre, packet gateway servers according to the test scenario. Then, the tester (developer) uses the mobile communication terminal test device to communicate with the mobile communication terminal to be tested and checks the operating state of the mobile communication terminal and a communication state between the mobile communication terminal and the mobile network with reference to log information during communication, thereby testing whether the mobile communication terminal conforms to required standards and can communicate and behave normally.

With the evolution of mobile communication technology, an increasing number of communication standards exist. The staged rollout of new communication technology demands that mobile communication terminals are able to communicate with a wide range of mobile communication technologies, protocols and base station standards. As such, mobile communication terminal test devices are designed to simulate a plurality of communication bands, protocols and standards so that a mobile communication terminal can be tested against modern standards and also regression tested against older standards. Examples of protocols a mobile communication terminal may be tested against includes Long Term Evolution (LTE), LTE-Advanced (a next-generation standard of LTE), third generation partnership project (3GPP or simply 3G), Edge, and GSM (global system for mobile communications) to name a few.

The requirement to develop a test scenario which can evaluate whether a mobile communication terminal is correctly operating across a wide range of standards and communication protocols necessarily requires a complex set of test procedures which may be produced by different test developer groups and then combined into a single test scenario.

Typically, these test scenarios have multiple execution paths to accommodate the variety of communication standards and protocols, expected responses the mobile communication terminal and test conditions. A test scenario, when executed according to a particular test configuration, forms a test operation. Typical mobile communication terminal test devices perform test operations and indicate a pass/fail for each such operation.

The intent of the test designer is that executing a test scenario with a range of configuration information would enable complete testing through all execution paths of a test scenario. In practice, it is impossible to determine whether a test scenario will execute through all possible execution paths until testing is performed on a mobile communication terminal. This presents test designers with a challenge in verifying a mobile communication terminal has been fully tested via execution of numerous test operations. The indication of pass/fail for each test operation is not sufficient for a test designer to determine whether complete testing has occurred.

SUMMARY OF THE INVENTION

In according with one aspect of the invention, there is provided a mobile communication terminal test device having at least one configurable communication device that communicates with a mobile communication terminal to perform a test operation, comprising:

- a data store storing test procedures, test scenarios, and configuration data, each test scenario defined by a plurality of test procedures arranged in a plurality of execution paths, each test scenario further defined by configuration data associated therewith, wherein said configuration data comprises configuration data for said configurable communication device and mobile communication terminal configuration data;
- a test engine unit that determines a test procedure to be executed as part of a test scenario and communicates said test procedure to a test execution unit;
- a test execution unit in communication with the configurable communication device to execute said test procedure and return an outcome of said test procedure execution to the test engine unit;
- the test engine unit storing a test log, each entry in the test log corresponding to either a test procedure determined to be executed or an outcome of a test procedure execution received from the test execution unit;
- a test analysis unit responsive to a user-selected test from the data store, the test analysis unit determining an execution path of each of a plurality of test operations in the test log corresponding to the user-selected test scenario and comparing the execution path of each of a plurality of test operations to the plurality of execution paths of the user-selected test;
- a display control unit that displays a screen comparing the execution path of each of a plurality of test operations to the plurality of execution paths of the user-selected test on a display unit.

Preferably, the test log further includes communication messages sent and received from the mobile communication terminal.

Preferably, the test engine unit is arranged to store a copy of the test scenario in the test log.

Preferably, the test analysis unit determines an execution frequency of each test procedure, wherein said display control unit displays the execution frequency on the screen.

Preferably, the test analysis unit determines any test procedures in said user-selected test that were not executed in any of the plurality of test operations in the test log, whereby the display control unit highlights said non-executed test procedures on the screen.

Preferably, the test analysis unit further compares outcomes of each test procedure execution in each of the plurality of test operation in the test log, the display control unit arranged to display said outcome comparison on the screen.

Preferably, the test analysis unit determines any outcomes of each test procedure in the user-selected test not present in the test log, the display control unit arranged to display said outcomes on the screen.

In accordance with a second aspect of the invention, there is provided a method for analysing test operations performed on a mobile communication terminal, comprising:

storing test procedures, test scenarios, and configuration data in a data store, each test scenario defined by a plurality of test procedures arranged in a plurality of execution paths, each test scenario further defined by configuration data associated therewith, wherein said configuration data comprises configuration data for at least one configurable communication devices and mobile communication terminal configuration data;

determining a test procedure to be executed as part of a test scenario;

communicating with the mobile communication terminal according to the test procedure, executing said test procedure and determining an outcome of said test procedure execution;

storing a test log, each entry in the test log corresponding to either a test procedure determined to be executed or an outcome of a test procedure execution;

determining an execution path of each of a plurality of test operations in the test log corresponding to a user-selected test scenario and comparing the execution path of each of a plurality of test operations to the plurality of execution paths of the user-selected test;

displaying a screen comparing the execution path of each of a plurality of test operations to the plurality of execution paths of the user-selected test.

Preferably, the step of storing a test log further comprises storing communication messages sent and received from the mobile communication terminal in the test log.

Preferably, the step of storing a test log further comprises storing a copy of the test scenario in the test log.

Preferably, the step of comparing the execution path of each of a plurality of test operations comprises determining an execution frequency of each test procedure, wherein said step of displaying a screen further comprises displaying the execution frequency.

Preferably, said method further comprises the step of determining any test procedures in said user-selected test that were not executed in any of the plurality of test operations in the test log, wherein the step of displaying a screen further comprises highlighting said non-executed test procedures on the screen.

Preferably, said method further comprises the steps of comparing outcomes of each test procedure execution in each of the plurality of test operation in the test log, and displaying said outcome comparison on the screen.

Preferably, said method further comprises the step determining any outcomes of each test procedure in the user-selected test not present in the test log, wherein the step of displaying a screen further comprises displaying said outcomes on the screen.

In accordance with a third aspect of the invention, there is provided a computer-implemented method for analysing test operations performed on a mobile communication terminal, comprising:

storing test procedures, test scenarios, and configuration data in a data store, each test scenario defined by a plurality of test procedures arranged in a plurality of execution paths, each test scenario further defined by configuration data associated therewith, wherein said configuration data comprises configuration data for at least one configurable communication devices and mobile communication terminal configuration data;

determining a test procedure to be executed as part of a test scenario;

communicating with the mobile communication terminal according to the test procedure, executing said test procedure and determining an outcome of said test procedure execution;

storing a test log, each entry in the test log corresponding to either a test procedure determined to be executed or an outcome of a test procedure execution;

determining an execution path of each of a plurality of test operations in the test log corresponding to a user-selected test scenario and comparing the execution path of each of a plurality of test operations to the plurality of execution paths of the user-selected test;

displaying a screen comparing the execution path of each of a plurality of test operations to the plurality of execution paths of the user-selected test.

Preferably, the step of storing a test log further comprises storing communication messages sent and received from the mobile communication terminal in the test log.

Preferably, the step of storing a test log further comprises storing a copy of the test scenario in the test log.

Preferably, the step of comparing the execution path of each of a plurality of test operations comprises determining an execution frequency of each test procedure, wherein said step of displaying a screen further comprises displaying the execution frequency.

Preferably, said method further comprises the step of determining any test procedures in said user-selected test that were not executed in any of the plurality of test operations in the test log, wherein the step of displaying a screen further comprises highlighting said non-executed test procedures on the screen.

Preferably, said method further comprises the steps of comparing outcomes of each test procedure execution in each of the plurality of test operation in the test log, and displaying said outcome comparison on the screen.

Preferably, said method further comprises the step determining any outcomes of each test procedure in the user-selected test not present in the test log, wherein the step of displaying a screen further comprises displaying said outcomes on the screen.

BRIEF DESCRIPTION OF THE FIGURES

The invention will now be described with reference to the accompanying drawings, in which.

DESCRIPTION OF PREFERRED EMBODIMENTS

Figure 1:
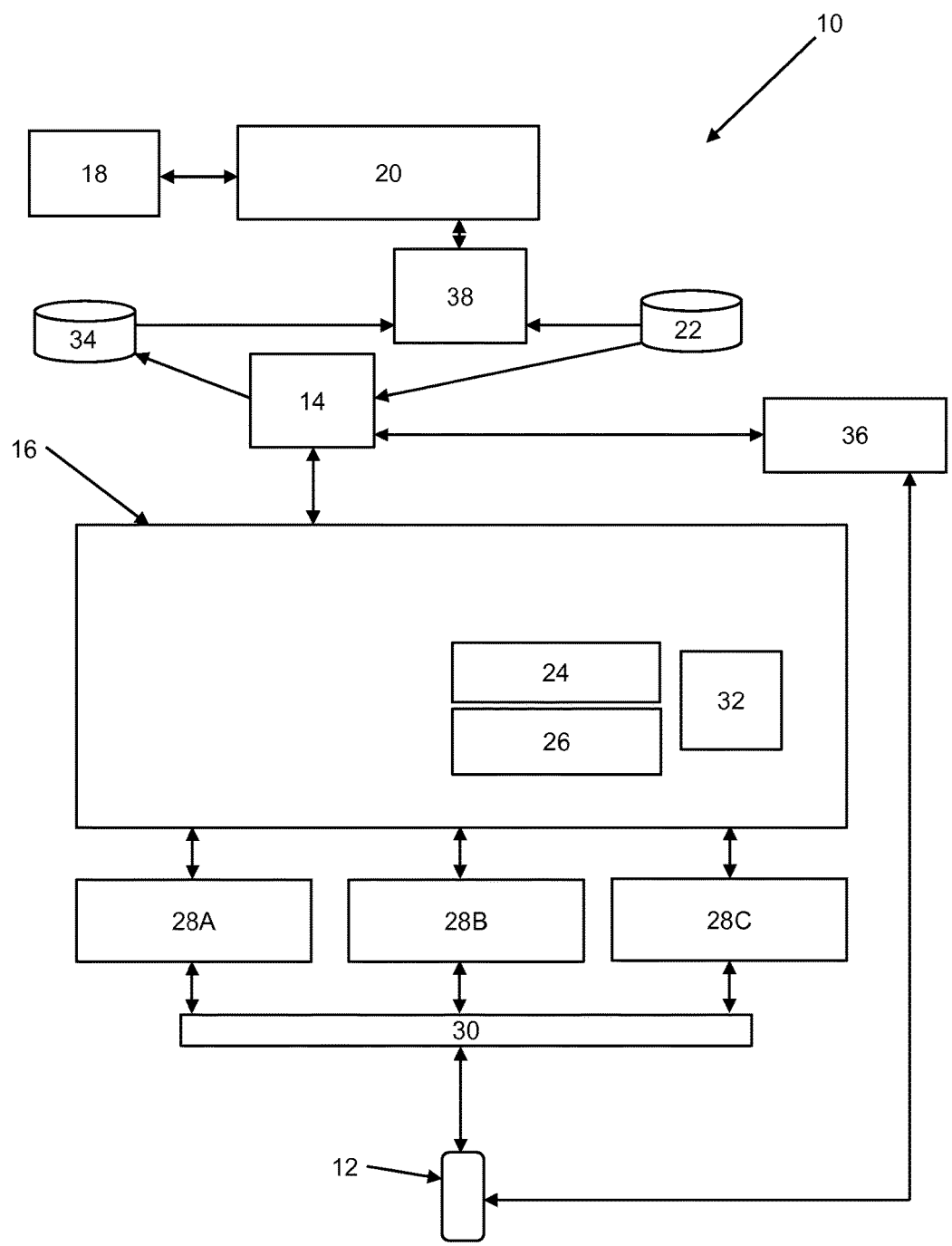
FIG. 1 is a block diagram of a mobile communication terminal test device according to an embodiment of the invention.

FIG. 1 shows a block diagram of the mobile communication terminal test device 10 according to the embodiment which communicates with a mobile communication terminal 12 to perform a test operation.

The mobile communication terminal test device 10 comprises a test engine unit 14, a test procedure library 22, a test execution unit 16 having an execution procedure library 24, and a display control unit 20 which displays a screen on a display unit 18. The device 10 further comprises communication devices 28A to 28C each of which has a radio frequency output that is connected to an RF combiner 30 for sending and receiving signals to and from the mobile communication terminal 12 via an antenna or a cable (not shown).

The test procedure library 22 of the embodiment comprises a procedure definition for each test scenario and test procedure. Each procedure definition includes a unique identifier, one or more configuration parameters and one or more test outcomes. Each test outcome has a unique outcome identifier.

Test scenario definitions in the library 22 includes the unique identifiers of test procedures forming part of the test scenario. In addition, the test scenario definition may include a unique identifier of a further test procedure associated with an outcome identifier of a test procedure in the test scenario, wherein the further test procedure is to be executed in the event the outcome of the test procedure is that test outcome. In this manner, a test scenario defines execution paths from commencement of the operation to test completion.

Configuration parameters include configuration parameters for the communication devices 28A-28C necessary to configure the devices 28A-28C for the test scenario. Such configuration information may include whether the device is to simulate a base station or other element of the network infrastructure, which frequency bands, channels and protocols to use when communicating with the mobile communication terminal 12, and state information.

Configuration parameters may also include configuration information for the mobile communication terminal 12, for example to place the mobile communication terminal 12 in a state necessary to perform the test.

The execution procedure library 24 includes an executable procedure for each test procedure in the procedure library 22. The execution procedure library 24 and the test procedure library 22 form a data store in the embodiment.

Figure 2:
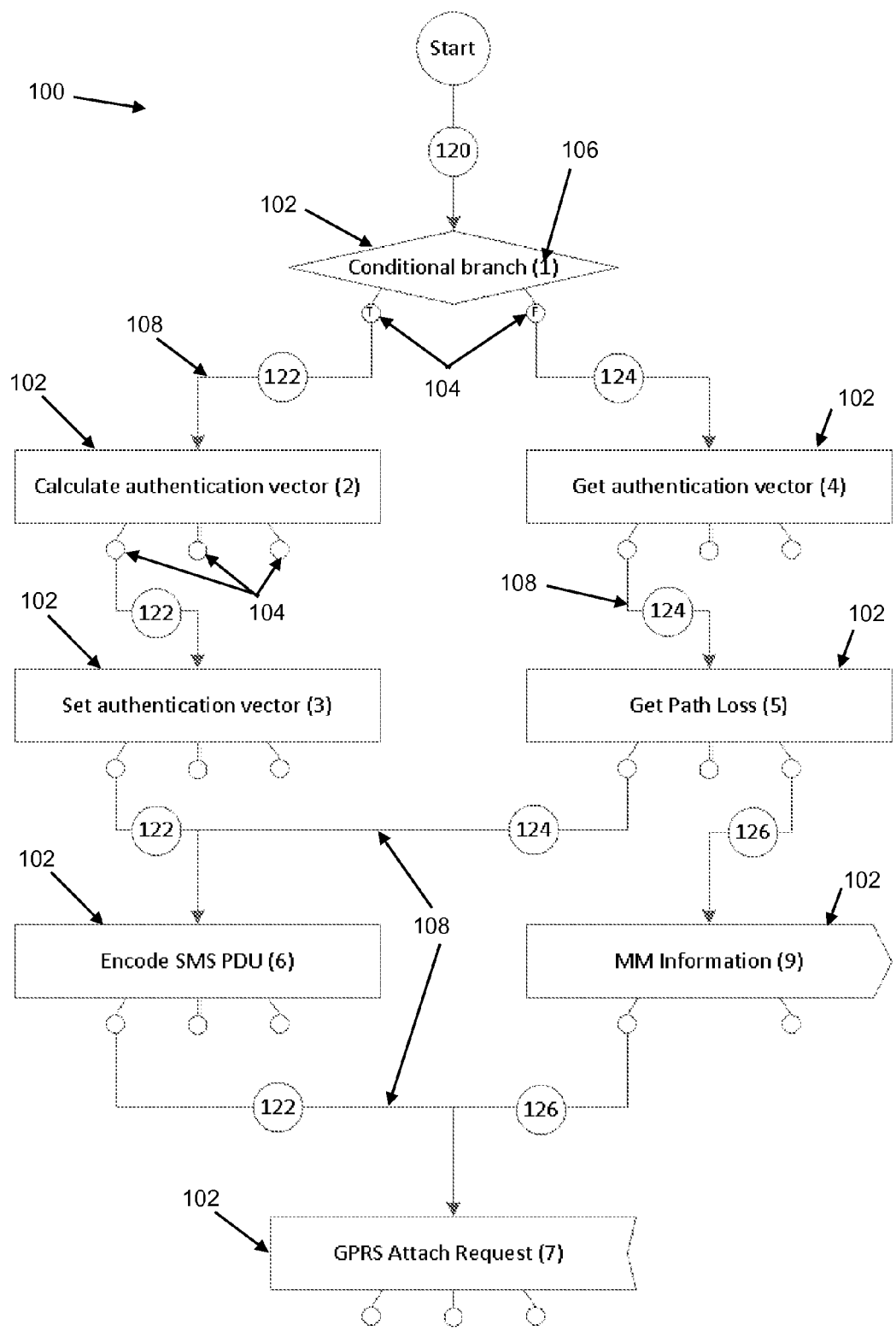
FIG. 2 show an example test scenario with execution frequency displayed thereon.

Referring now to FIG. 2, there is shown an example of a test scenario 100. The test scenario 100 comprises test procedures 102, each of which has several test outcomes 104 and a test procedure identifier 106. Lines 108 in FIG. 2 connect test outcomes of one test procedure to a further test procedures, visually representing the unique identifier of a further test procedure associated with an outcome identifier of a test procedure. In this manner, an execution flow of the test scenario 100 is represented in the library 22. As shown in FIG. 2, multiple execution paths through a test scenario are possible. The test scenario 100 shown in FIG. 2 is a simple example; in practice test scenarios are significantly more complex with a corresponding increase in possible execution paths.

Referring back now to FIG. 1, to perform a test scenario, the test engine unit 14 receives a request to execute a test scenario from a user of the mobile communication terminal test device 10 via a user input device (not shown). The test engine unit 14 retrieves a procedure definition for the test scenario from the test procedure library 22.

Next, the test engine unit 14 initialises the test execution unit 16 by sending initialisation commands to it according to the test scenario. The initialisation commands are determined from test definition's configuration data and the procedure libraries, and hence hardware instrument configurations, which will be require to execute it. The test execution unit initialises the procedure libraries 24 and protocol codec 26. The protocol codec will be understood by those skilled in the art to include hardware instrument control and protocol codecs. Further initialisation instructions may be communicated to each communication device 28 in order to configure the communication devices 28A, 28B and 28C into a desired operating mode according to the test scenario.

If specified in the test procedure definition, configuration commands are communicated directly to the mobile communication terminal 12 by the test engine unit 14 via a Hayes AT-style, man-machine interface (MMI) command proxy 36, such as via a USB cable. These configurations commands put the mobile communication terminal 12 into a desired operating state in order to test a specific operational aspect of the mobile communication terminal 12.

After initialisation is complete, the test engine unit 14 sends a run procedure request to the test execution unit 16 corresponding to the first procedure that appears after the start point in the test scenario 100. Each run procedure request includes the test procedure's unique identifier and parameter definitions such as variables to be passed to procedures when executing them.

The test execution unit 16 receives the run procedure request from the test engine unit 14 and executes the test procedure by calling the execution procedure library with any supplied parameters. Execution of test procedures requires calls to specific protocol codec 26 provided in the test execution platform 16. Calls to protocol codec 26 typically result in messages being communicated to communication devices 28A, 28B and 28C, denoted generally at 28. The communication devices 28 operate as a base station simulators.

The test execution unit 16 communicates with the communication devices 28 using a transport protocol typically used by mobile telecommunication equipment, such as the transport control protocol/internet protocol (TCP/IP). Each hardware instrument 28 has its own IP address which the test execution unit 16 uses to send and receive messages to and from the hardware instrument 28. In this manner, the mobile communication terminal test device 10 is able to simulate the operation of mobile network equipment and base stations using the same communication protocols to enable thorough testing of the mobile communication terminal 12. For example, the communication devices 28A, 28B and 28C could be configured to communicate using CDMA, 3G and 4G/LTE cellular communication systems respectively. It should be appreciated that other configurations are possible according to the test scenario.

The protocol codec 26 of the test execution unit 16 sends and receives messages to and from the communication devices 28 in order to simulate various aspects of a mobile telecommunication system.

The test execution unit 16 stores a copy of each message sent to each hardware instrument 28 and of each message received from each hardware instrument 28 in a message log 32. Each message is stored in the log 32 with a timestamp corresponding to the elapsed time since the test scenario began execution at which the message was transmitted or received.

When the test execution unit 16 completes executing a test procedure, a run procedure return message is sent to the test engine unit 14. The run procedure return includes the outcome identifier of the test procedure execution outcome according to the procedure definition parameters.

The test engine unit 14 stores a list of test procedures executed along with test outcomes and console messages in a test log 34.

The test engine unit 14 determines from the test procedure execution outcome received from the test execution unit 16 and the test scenario definition the next test procedure to execute, by referencing test procedure identifier associated with the test procedure outcome identifier received from the test execution unit 16. The test engine unit then retrieves the next test procedure definition from the procedure library 22 and sends a run procedure request to the test execution unit 16. In this manner, a test scenario, test procedure or campaign of tests can be run by the mobile communication terminal test device 10.

Once the test scenario has completed, the test engine unit 14 sends a shutdown command to the test execution unit 16, which then closes the procedure libraries 24, protocol codec 26, stops the message log 32 and shuts down the communication devices 28. Thus, each test operation is a self-contained operation of the mobile communication terminal test device 10.

The mobile communication terminal test device 10 further comprises a test analysis unit 38 which receives a request to analyse a test scenario from a user of the mobile communication terminal test device 10 via a user input device (not shown).

The test analysis unit 38 retrieves the procedure definition for the test scenario from the test procedure library 22, including test procedure identifiers, outcome identifiers and associated procedure identifiers, for each test procedure in the user-selected test scenario.

Next, the test analysis unit 38 reads the test log 34 and identifies test operations in the test log corresponding to the user-selected test scenario. In one embodiment, each test scenario version is assigned a unique identifier which is stored in the test procedure library 22 and also in the test log 34 at the commencement of executing a test scenario, and the test analysis unit 38 uses the unique identifier to find test operations in the test log corresponding to the user-selected test scenario. An alternative embodiments, a copy of the test scenario is stored in the test log by the test engine unit 14, in which case the test analysis unit 38 identifies test operations in the test log corresponding to the user-selected test scenario by comparison of the test scenarios in the test log with the user-selected test scenario.

For each matching test operation in the test log 34, the test analysis unit compares the execution path of that test operation to the plurality of execution paths of the user-selected test scenario by using the association of test outcome identifiers and further test procedure identifiers in the procedure definition retrieved from the library 22. In one embodiment, the test analysis unit 38 stores a count of which test procedures were executed by each matching test operation in the test log 34. In other embodiments, the test analysis unit 38 further stores counts of test outcomes for each test procedure, and may also store, for each variable and parameter in the test scenario definition, counts of the values of these variables and parameters at the input and output of each test procedure.

Figure 3:
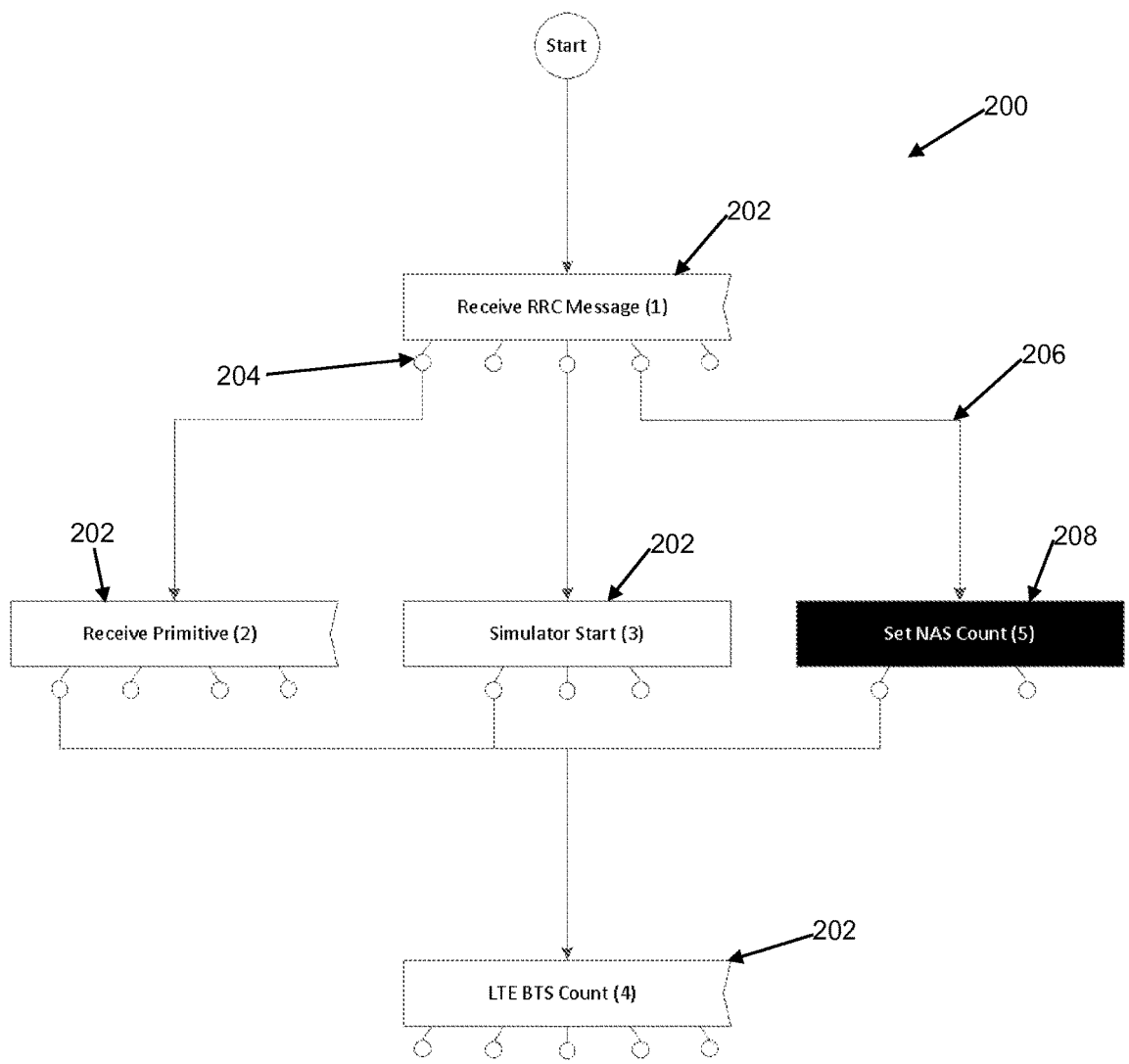
FIG. 3 shows an execution path analysis display of the mobile communication terminal test device of FIG. 1, in which a non-executed test procedure is highlighted.

The test analysis unit 38 next determines whether any test procedures in the user-selected test scenario have not been executed in any of the test operations in the test log 34. The test analysis unit 38 communicates with the display control unit 20 to display a screen identifying any such non-executed test procedures, an example of which is shown in FIG. 3. As shown in FIG. 3, the display shows a test scenario 200 including test procedures 202, test outcomes 204 and execution paths 206 determined from the test scenario definition in the library 22. A test procedure 208 is highlighted in the display to indicate this test procedure was not executed in any of the test operations. The test procedure 208 highlights to a user elements of the mobile communication terminal 12's operation which have not been tested for conformance. The user may then investigate whether the cause of the non-execution is due to test scenario design flaws or incorrect operation of the mobile communication terminal 12.

Figure 4:
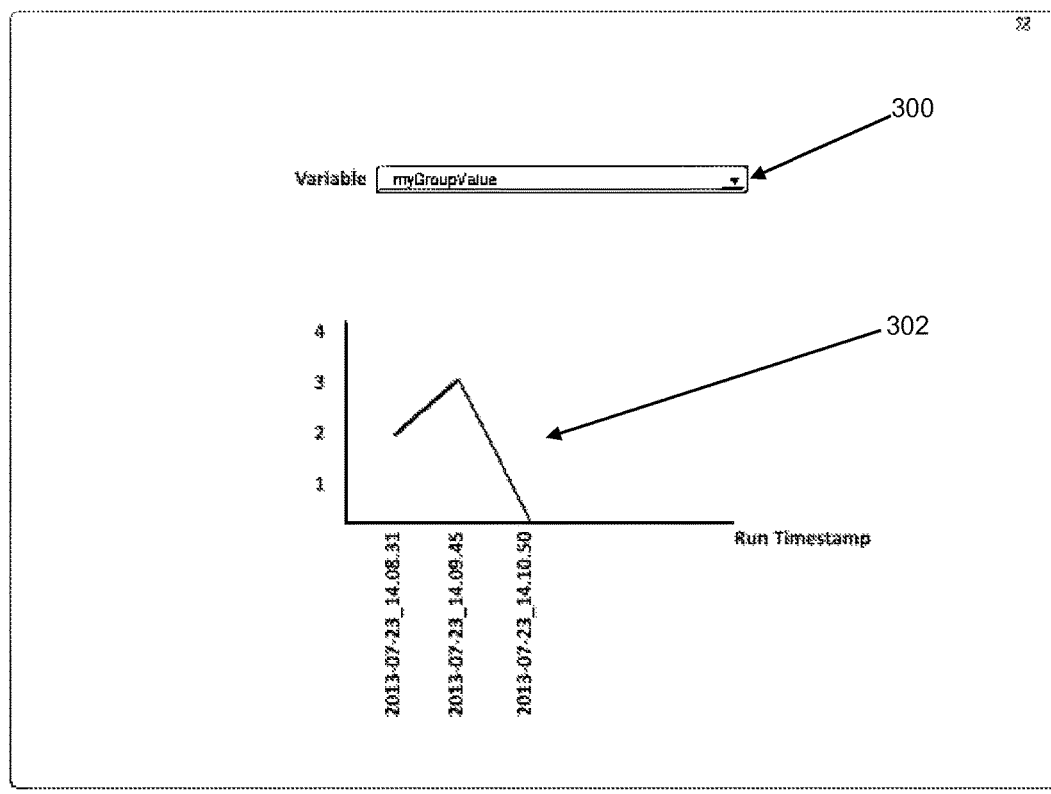
FIG. 4 shows a test procedure outcome display of the mobile communication terminal test device of FIG. 1.

The test analysis unit 38 may also be configured to analyse test outcomes and variable and parameter values across a plurality of test scenario executions as described above, in which case a user may select a test procedure 202, 208 on the display to view outcome, parameter or variable values. FIG. 4 shows an example display produced by the display control unit 20 for this purpose. As shown, where a user can select a parameter, outcome or variable at 300. A representation of the count of the selected parameter, outcome or variable is displayed at 302. The selectable parameter, outcome or variable relate to communications sent to or received from the mobile communication terminal 12 and thus the user is able to better understand the operation of the mobile communication terminal 12 than simply an overall pass/fail at a test scenario level.

As would be apparent to those skilled in the art, many alternative representations to that shown in FIGS. 3 and 4 are possible. One such alternative is shown in FIG. 2 where indicators 120, 122, 124 and 126 are displayed by the display control unit 20. The indicators 120, 122, 124 and 126 are present on the execution paths and represent paths that were always executed (120), frequently executed (122), occasionally executed (124) and not executed (126). The indicators 120, 122, 124 and 126 may be visually distinguished in any convenient manner such as colour, shape, or symbol as would be apparent to those skilled in the art.

Modifications and variations such as would be apparent to a person skilled in the art are within the scope of the invention.

The invention claimed is:

1. A mobile communication terminal test device having at least one configurable communication device that communicates with a mobile communication terminal to perform a test operation, comprising:
    a data store storing test procedures, test scenarios, and configuration data, each test scenario defined by a plurality of test procedures arranged in a plurality of execution paths, each test scenario further defined by configuration data associated therewith, wherein said configuration data comprises configuration data for said configurable communication device and mobile communication terminal configuration data;
    a test engine that determines a test procedure to be executed as part of a test scenario and communicates said test procedure to a test execution platform;
    a test execution platform in communication with the configurable communication device to execute said test procedure and return an outcome of said test procedure execution to the test engine;
    the test engine storing a test log, each entry in the test log corresponding to either a test procedure determined to be executed or an outcome of a test procedure execution received from the test execution platform;
    a test analysis unit responsive to a user-selected test from the data store, the test analysis unit:
        determining an execution path of each of a plurality of test operations in the test log corresponding to the user-selected test scenario and comparing the execution path of each of a plurality of test operations to the plurality of execution paths of the user-selected test, and comparing outcomes of each test procedure execution in each of the plurality of test operation in the test log, and determining any outcomes of each test procedure in the user-selected test not present in the test log; and a display control unit that displays a screen comparing the execution path of each of a plurality of test operations to the plurality of execution paths of the user-selected test on a display unit, and that is arranged to display said outcome comparison and said outcomes on the screen.

2. The mobile communication terminal test device of claim 1, wherein the data store is implemented as a memory or storage device of a computer, and wherein the test engine, test execution platform, test analysis unit, and display control unit are implemented as at least one processor of a computer.

3. A method for analysing test operations performed on a mobile communication terminal, comprising:

storing test procedures, test scenarios, and configuration data in a data store, each test scenario defined by a plurality of test procedures arranged in a plurality of execution paths, each test scenario further defined by configuration data associated therewith, wherein said configuration data comprises configuration data for at least one configurable communication device and mobile communication terminal configuration data;

determining a test procedure to be executed as part of a test scenario;

communicating with the mobile communication terminal according to the test procedure, executing said test procedure and determining an outcome of said test procedure execution;

storing a test log, each entry in the test log corresponding to either a test procedure determined to be executed or an outcome of a test procedure execution;

determining an execution path of each of a plurality of test operations in the test log corresponding to a user-selected test scenario and comparing the execution path of each of a plurality of test operations to the plurality of execution paths of the user-selected test displaying a screen comparing the execution path of each of a plurality of test operations to the plurality of execution paths of the user-selected test;

comparing outcomes of each test procedure execution in each of the plurality of test operation in the test log;

displaying said outcome comparison on the screen; and determining any outcomes of each test procedure in the user-selected test not present in the test log, wherein the step of displaying a screen further comprises displaying said outcomes on the screen.

4. A computer-implemented method for analysing test operations performed on a mobile communication terminal, comprising:

storing test procedures, test scenarios, and configuration data in a data store, each test scenario defined by a plurality of test procedures arranged in a plurality of execution paths, each test scenario further defined by configuration data associated therewith, wherein said configuration data comprises configuration data for at least one configurable communication device and mobile communication terminal configuration data;

determining a test procedure to be executed as part of a test scenario;

communicating with the mobile communication terminal according to the test procedure, executing said test procedure and determining an outcome of said test procedure execution;

storing a test log, each entry in the test log corresponding to either a test procedure determined to be executed or an outcome of a test procedure execution;

determining an execution path of each of a plurality of test operations in the test log corresponding to a user-selected test scenario and comparing the execution path of each of a plurality of test operations to the plurality of execution paths of the user-selected test;

displaying a screen comparing the execution path of each of a plurality of test operations to the plurality of execution paths of the user-selected test;

comparing outcomes of each test procedure execution in each of the plurality of test operation in the test log;

displaying said outcome comparison on the screen; and determining any outcomes of each test procedure in the user-selected test not present in the test log, wherein the step of displaying a screen further comprises displaying said outcomes on the screen.

* * * * *